US011222348B2

United States Patent
Kim et al.

(10) Patent No.: US 11,222,348 B2
(45) Date of Patent: Jan. 11, 2022

(54) CONTEXT-SPECIFIC EXPERIENCE SAMPLING METHOD AND SYSTEM

(75) Inventors: Yongse Kim, Seoul (KR); Jin Hui Kim, Changwon-si (KR); Yeonkoo Hong, Seoul (KR)

(73) Assignee: Research & Business Foundation Sungkyunkwan University, Suwon-si (KR)

(*) Notice: Subject to any disclaimer, the term of this patent is extended or adjusted under 35 U.S.C. 154(b) by 1130 days.

(21) Appl. No.: 14/126,917

(22) PCT Filed: Jun. 18, 2012

(86) PCT No.: PCT/KR2012/004796
§ 371 (c)(1),
(2), (4) Date: May 27, 2014

(87) PCT Pub. No.: WO2012/173446
PCT Pub. Date: Dec. 20, 2012

(65) Prior Publication Data
US 2014/0289013 A1   Sep. 25, 2014

(30) Foreign Application Priority Data
Jun. 17, 2011 (KR) .................... 10-2011-0058941

(51) Int. Cl.
*G06Q 30/02* (2012.01)
(52) U.S. Cl.
CPC ................................ *G06Q 30/0203* (2013.01)
(58) Field of Classification Search
CPC ............... G06Q 30/0635; G06Q 50/34; G06Q 30/0246; G06Q 30/0276; G06Q 10/00;
(Continued)

(56) References Cited

U.S. PATENT DOCUMENTS

2001/0037206 A1* 11/2001 Falk ...................... G06Q 30/02
705/1.1
2002/0029162 A1* 3/2002 Mascarenhas ...... G06F 16/9535
705/7.32
(Continued)

FOREIGN PATENT DOCUMENTS

JP  2003-67551   3/2003
JP  2004-341719  12/2004

OTHER PUBLICATIONS

International Search Report dated Dec. 28, 2012 in International Application No. PCT/KR2012/004796 (2 pages).
(Continued)

*Primary Examiner* — Chinyere Mpamugo
(74) *Attorney, Agent, or Firm* — NSIP Law

(57) ABSTRACT

The present invention relates to a context-specific experience sampling method comprising the steps of: collecting user's experience information; classifying the collected user's experience information and selecting keywords representing the classified user's experience information; generating a questionnaire to be applied to experience sampling based on the keywords; providing the questionnaire to the user; receiving response data by each activity for a context and an environment that the user has experienced, in response to the questionnaire; and analyzing a relationship between the user's context and environment and the user's experience, based on the response data by each activity for the user's context and environment.

16 Claims, 6 Drawing Sheets

(58) Field of Classification Search
CPC .............. G06Q 10/02; G06Q 10/0631; G06Q 10/0635; G06Q 10/067; G06Q 10/10; G06Q 10/20; G06Q 20/389; G06Q 30/00; G06Q 30/012; G06Q 30/018; G06Q 30/02; G06Q 30/0247; G06Q 30/0265; G06Q 30/0266; G06Q 30/0267; G06Q 30/0277; G06Q 30/0633; G06Q 30/0639; G06Q 30/0641; G06Q 30/0645; G06Q 40/04; G06Q 40/08; G06Q 50/01; G06Q 50/22; G06Q 50/30; G06Q 30/0203; G06Q 30/0269; G06Q 10/087; G06Q 10/1093; G06Q 20/10; G06Q 30/0251; G06Q 30/0204; G06Q 10/101; G06Q 40/06; G06Q 40/00; G06Q 10/06; G06Q 10/06375; G06Q 30/0201; G06Q 40/025; G06Q 10/06311; G06Q 10/06316; G06Q 10/0633; G06Q 10/06398; G06Q 30/0207–0277; H04L 67/306; H04L 67/12; H04L 67/10; H04L 67/1097; H04L 67/125; H04L 1/0002; H04L 5/0064; H04L 67/125; H04L 67/30; H04L 63/08; H04L 12/1822; H04L 51/14; H04L 51/16; H04L 51/32; H04L 63/0428; H04L 63/061; H04L 63/102; H04L 67/10; H04L 41/22; H04W 84/18; H04W 4/38; H04W 84/20; H04W 4/08; G06N 20/00; G06F 16/242; G06F 3/0484; G06F 16/9535; G06F 16/285; G06F 16/337; G06F 16/355; G06F 16/00; G06F 40/174; G06F 21/60; G06F 3/0487; G06F 30/0204; G06F 30/0269; G06F 3/04815; G06F 8/20; G06F 16/213; G06F 16/2425; G06F 16/24564; G06F 16/248; G06F 16/26; G06F 16/287; G06F 19/3418; G06F 21/6209; G06F 2203/0331; G06F 3/017; G06F 3/0202; G06F 3/0362; G06F 3/044; G06F 3/0485; G06F 40/123; G06F 40/131; G06F 16/2428; G06F 16/9035; G06F 16/954; G06F 3/0481; G06F 3/1454; G06F 3/167; G06F 17/16; G16H 20/70; G16H 10/20; G16H 20/60; G16H 50/20; G16H 70/00; G09B 19/00

See application file for complete search history.

(56) References Cited

U.S. PATENT DOCUMENTS

| | | | | |
|---|---|---|---|---|
| 2010/0004977 | A1* | 1/2010 | Marci | G06Q 10/10 705/7.32 |
| 2011/0151418 | A1* | 6/2011 | Delespaul | A61B 5/165 434/236 |
| 2011/0152635 | A1* | 6/2011 | Morris | G06Q 10/00 600/301 |
| 2011/0313308 | A1* | 12/2011 | Zavoronkovs | A61B 5/377 600/544 |
| 2012/0130196 | A1* | 5/2012 | Jain | A61B 5/681 600/300 |
| 2014/0306821 | A1* | 10/2014 | Rahman | G16H 40/67 340/539.11 |

OTHER PUBLICATIONS

Jungsuk Seo et al., Design of an Experience Monitoring and Sampling System for Context-aware Mobile Applications, HCI 2009 Conference, Feb. 28, 2009, pp. 837-838 (In Korean with English Abstract).

Heeyung Moon et al., A literature survey of measuring the user experience, Ergonomics Society of Korea, Fall Conference, Dec. 31, 2010, pp. 2-3 (In Korean with English Abstract).

Seung Yun Shin et al., Experience Sampling Method: Theory and Practice, The Korean Journal of Measurement and Evaluation in physical Education and Sports Science, vol. 12 No. 3, Dec. 31, 2010 (17 pages, In Korean with English Abstract).

* cited by examiner

CONTEXT-SPECIFIC EXPERIENCE SAMPLING METHOD AND SYSTEM

CROSS-REFERENCE TO RELATED APPLICATIONS

This application is a U.S. National Stage Application of International Application No. PCT/KR2012/004796, filed on Jun. 18, 2012, which claims the benefit under 35 USC 119(a) and 365(b) of Korean Patent Application No. 10-2011-0058941, filed on Jun. 17, 2011, in the Korean Intellectual Property Office.

Field of the Invention

The present disclosure relates to a context-specific experience sampling method and system.

Background of the Invention

Experience sampling refers to a technique of capturing, collecting and analyzing people's activities, thoughts, feelings and so on in real time.

In order to acquire user's experience information, a conventional technology has provided simple and uniform questions to a user and sampled user's experience information based on user's answer to the questions.

However, the conventional procedures for processing user's experience information do not execute a context-based experience information processing procedure, which systemically considers user's context, prior to sampling user's experience. Specifically, the conventional information processing procedure has been problematic since it provides low reliability in relevant questionnaires and sampling procedures, which are used when generating experience sampling data, and obtained results. Further, the conventional information processing procedure had time and space restrictions in the process of sampling user's experience.

Accordingly, a need for a context-specific experience sampling method, which provides high reliability and is effective so as to be applied to customer research, experience design research and so on, is being demanded.

BRIEF SUMMARY OF THE INVENTION

Some illustrative embodiments of the present disclosure have a purpose to provide a context-specific experience sampling method, which collects user's experience information, generates a questionnaire to be provided to a user based on user's activity pattern and others, and analyzes a relationship between user's experience and user's characteristics, context and environment by each activity based on response data received from the user.

However, the technical problems sought to be solved by the illustrative embodiments of the present disclosure are not limited to those described above. There may be other technical problems sought to be solved by the illustrative embodiments of the present disclosure.

In accordance with a first aspect of the illustrative embodiments, there is provided a context-specific experience sampling method, comprising: (a) collecting user's experience information; (b) classifying the collected user's experience information and selecting keywords representing the classified user's experience information; (c) generating a questionnaire to be applied to experience sampling based on the keywords; (d) providing the questionnaire to the user; (e) receiving response data by each activity for a context and an environment that the user has experienced, in response to the questionnaire; and (f) analyzing a relationship between the user's context and environment and the user's experience, based on the response data by each activity for the user's context and environment.

Further, in accordance with a second aspect of the illustrative embodiments, there is provided a context-specific experience sampling system, comprising: an experience information collection unit that collects user's experience information; an experience information classification unit that classifies the collected user's experience information and selects keywords representing the classified user's experience information, a questionnaire generation unit that generates a questionnaire to be applied to experience sampling based on the keywords; an experience sampling unit that provides the questionnaire to the user and receives response data by each activity for a context and an environment that the user has experienced, in response to the questionnaire; and an experience and context data analysis unit that analyzes a relationship between the user's context and environment and the user's experience, based on the response data by each activity for the user's context and environment input from the user.

Furthermore, in accordance with a third aspect of the illustrative embodiments, there is provided A context-specific experience sampling device, comprising: an experience sampling unit that provides a questionnaire associated with user's experience to the user, and receives response data by each activity for a context and an environment that the user has experienced, in response to the questionnaire; and an experience and context data analysis unit that analyzes a relationship between the user's context and environment and the user's experience by each activity, based on the response data by each activity for the user's context and environment, wherein the questionnaire is generated based on the user's context and environmental factors obtained by collecting the user's experience information and classifying the user's experience information.

According to one of the foregoing technical means of the present disclosure, it is possible to more accurately analyze a relationship between user's context and environment and user's experience with respect to each activity, by using response data by each activity for user's context and environment.

In addition, according to one of the foregoing technical means of the present disclosure, it is possible to further improve accuracy and reliability of analysis results, by also using results obtained from comparing and analyzing the response data by each activity for user's context and environment and video or audio data generated by a video or audio record device.

BRIEF DESCRIPTION OF THE DRAWINGS

Non-limiting and non-exhaustive embodiments of the present disclosure will be described in conjunction with the accompanying drawings. Understanding that these drawings depict only several embodiments in accordance with the disclosure and are, therefore, not to be intended to limit its scope, the disclosure will be described with specificity and detail through use of the accompanying drawings, in which.

DETAILED DESCRIPTION OF THE INVENTION

Figure 1:
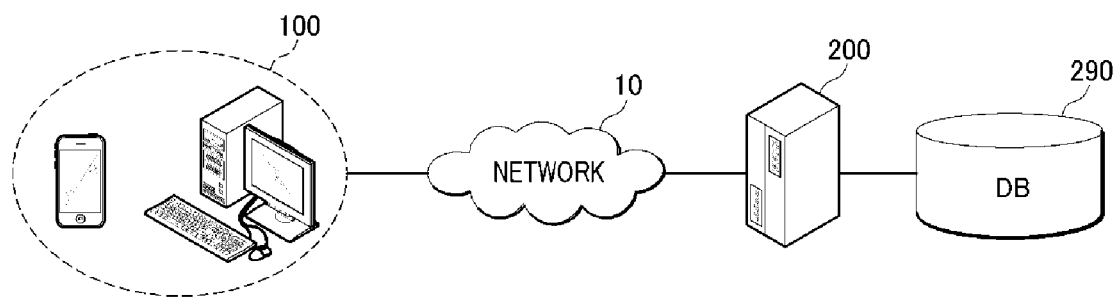
FIG. 1 is a configuration view for explanation of a context-specific experience sampling system in accordance with an illustrative embodiment of the present disclosure.

Hereinafter, illustrative embodiments of the present disclosure will be described in detail with reference to the attaching drawings so that inventive concept may be readily implemented by those skilled in the art. However, it is to be noted that the present disclosure is not limited to the illustrative embodiments but can be realized in various other ways. In the drawings, certain parts not directly relevant to the description are omitted to enhance the clarity of the drawings, and like reference numerals denote like parts throughout the whole document.

Throughout the whole document, the terms "connected to" or "coupled to" are used to designate a connection or coupling of one element to another element and include both a case where an element is "directly connected or coupled to" another element and a case where an element is "electronically connected or coupled to" another element via still another element. Further, the term "comprises or includes" and/or "comprising or including" used in the document means that one or more other components, steps, operations, and/or the existence or addition of elements are not excluded in addition to the described components, steps, operations and/or elements.

In addition, throughout the whole document, the meaning of the term "sampling" includes processing and evaluating information acquired from user's experience with respect to each activity to have various experience values (a relationship between the user's context and environment and the user's experience).

FIG. 1 is a configuration view for explanation of a context-specific experience sampling system in accordance with an illustrative embodiment of the present disclosure.

The context-specific experience sampling system may be realized in the manner that an experience sampling server 200 and a user terminal 100 are connected to each other through a network 10 or on an independent terminal, to which an experience sampling method is applied. FIG. 1 is a configuration view showing that the experience sampling server 200 and the user terminal 100 are connected to each other through the network 10, in accordance with an illustrative embodiment of the present disclosure.

The context-specific experience sampling system in accordance with an illustrative embodiment of the present disclosure may include the user terminal 100 and the experience sampling server 200, which are connected to the network 10, and a database 290.

The network 10 may be realized in a form of a wired network, e.g., a logical area network (LAN), a wide area network (WAN) or a value added network (VAN), or any type of a wireless network, e.g., a mobile radio communication network or a satellite communication network.

The user terminal 100 may be realized in a form of a computer or a mobile device accessible to a remote server through the network 10. Here, the computer may include, for example, a notebook equipped with Web browser, a desktop, a laptop and so on. The mobile device may be, for example, a wireless communication device assuring portability and mobility and include any types of handheld-based wireless communication devices such as a personal communication system (PCS), a global system for mobile communications (GSM), a personal digital cellular (PDC), a personal handyphone system (PHS), a personal digital assistant (PDA), an international mobile telecommunication (IMT)-2000, code division multiple access (CDMA)-2000, W-code division multiple access (W-CDMA), a wireless broadband Internet (WiBro) terminal and a smart phone.

The experience sampling server 200 receives user's experience information from the user terminal 100, classifies the received experience information to generate a questionnaire, and provides the generated questionnaire to the user terminal 100 to receive, from the user terminal 100, response data by each activity for a context and an environment that the user just has experienced. In addition, the experience sampling server 200 may execute sampling user's experience and analyze the user's experience information, based on the response data received from the user terminal 100. The data analyzed by the above-described processes may be used for customer researches, marketing researches and so on.

According to circumstances, the experience sampling server 200 may receive at least one of video data and audio data together with the response data and execute the analyzing work based on the received data.

The database 290 may be configured with a database management system for transmitting and receiving data and is connected for communication to the experience sampling server 200.

Figure 2:
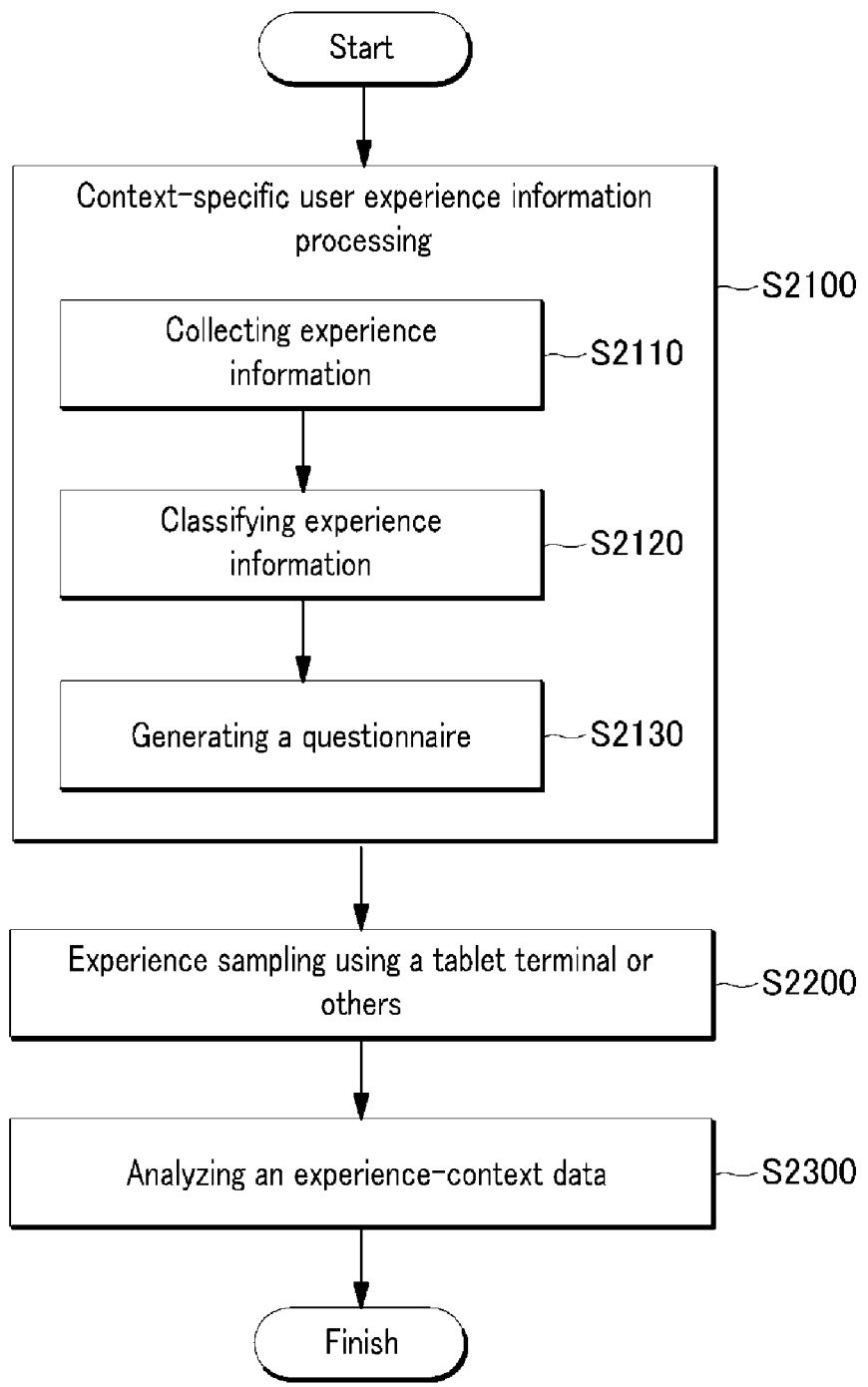
FIG. 2 is a flowchart illustrating entire processing processes, in the context-specific experience sampling system in accordance with an illustrative embodiment of the present disclosure.

FIG. 2 is a flowchart illustrating entire processing processes, in the context-specific experience sampling system in accordance with an illustrative embodiment of the present disclosure.

As shown in FIG. 2, the experience sampling system executes a context-specific experience information processing process (S2100) prior to experience sampling. Specifically, the experience sampling system collects user's experience information (S2110), classifies the collected user's experience information (S2120) and generates a questionnaire to be provided to the user based on the classified experience information (S2130).

Next, the experience sampling system executes experience sampling by using a sampling terminal (e.g., a tablet PC) configured in (attached to) a product or a service space (S2200).

Next, the experience sampling system executes analyzing user's experience and context data based on experience sampling data (S2300).

The experience information sampling is accomplished by providing a user with a questionnaire (multiple-choice questions) and receiving response data by each activity for user's experienced context and environment. In this process, it is possible to receive video and/or audio data together with the response data by using a video and/or audio record device.

The experience sampling system may extract significant data hidden in user's recognition and activity pattern, by analyzing the response data by user's activities or synthetically analyzing the response data by each activity and the video and/or audio data. Further, the experience sampling system may detect inconsistency, contradiction, etc., which may occur between user's activities and user's responses, so as to assure reliability of the response data.

Figure 3:
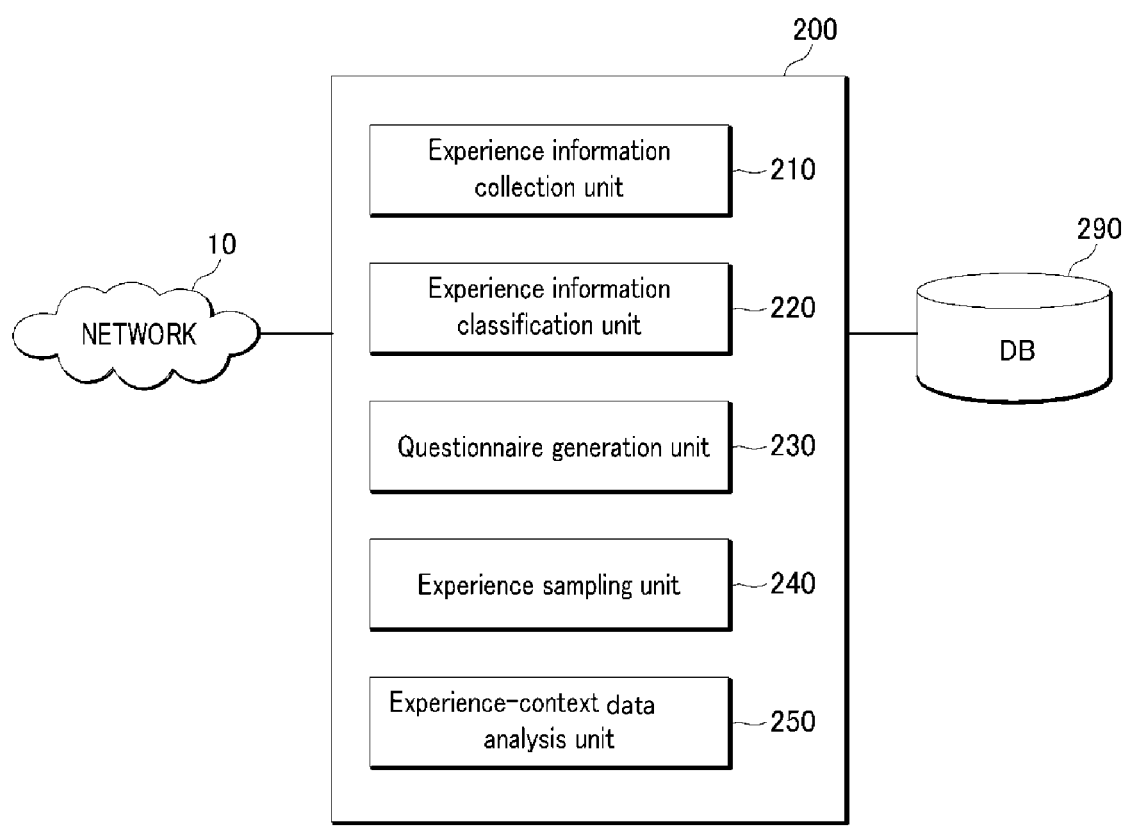
FIG. 3 is a configuration diagram illustrating configuration of an experience sampling server, in the context-specific experience sampling system in accordance with an illustrative embodiment of the present disclosure.

FIG. 3 is a configuration diagram illustrating configuration of the experience sampling server, in the context-specific experience sampling system in accordance with an illustrative embodiment of the present disclosure.

The experience sampling device in accordance with an illustrative embodiment of the present disclosure may include an experience information collection unit 210, an experience information classification unit 220, a questionnaire generation unit 230, an experience sampling unit 240 and an experience and context data analysis unit 250.

The experience information collection unit 210 executes collecting user's experience information. Here, user's experience information corresponds to data collected for review and analysis of user's activity characteristics, etc., by each context prior to experience sampling, in order to execute context-specific experience sampling. For example, the experience information collection unit 210 may collect user's experience information by using video data recording user's daily lives.

The experience information collection unit 210 may extract user's experience information through a data extraction method.

The experience information classification unit 220 executes classifying the collected user's experience information. The experience sampling system automatically classifies the experience information. The experience information classification unit 220 selects keywords (experience words), which can represent the experience information, through statistical analysis of the automatically classified experience information, or others. The experience information classification unit 220 may analyze user's activity pattern contained in the user's experience information to classify user's significant information including a user's repeated activity and an activity that the user wants to avoid, and select keywords for each of the classified information. For example, in case of researching user's response to a refrigerator, user's unusual activity pattern may be captured from his/her activities to open and close the refrigerator door. Keywords such as "comfortableness," "practicality" and "naturalness" may be classified from the activity pattern in the "user's activities to open and close the refrigerator door." The keywords may be used for executing user experience sampling.

The questionnaire generation unit 230 generates questionnaire (multiple-choice questions) data to be provided to a user, based on the keywords selected by the experience information classification unit 220.

The questionnaire (multiple-choice questions) may be included in a tablet terminal (tablet PC) to be provided to a user. The tablet terminal may be positioned adjacent to a location, in which sampling will be executed, and a product, for which sampling will be executed. Accordingly, a user does not need to carry the tablet terminal and can directly respond to the questionnaire at a sampling location. For example, in case of sampling user's experience information with respect to a "refrigerator," sampling user's experience information may be executed by providing the tablet terminal on a side surface of the refrigerator.

The experience sampling unit 240 may receive response data by each activity for user's experienced context and environment in response to the questionnaire to execute the experience sampling work. Here, the response data may be input through a tablet terminal.

The experience and context data analysis unit 250 executes synthetically comparing and analyzing experience sampling data. The comparing and analyzing work may be a basis for research of a relationship between an experience data and a context and environment data. The research results may be used for consumer research methods, marketing research methods, design research methods, emotional engineering research methods, social research methodology, ethnographic research methodology, behavioral research methodology and so on.

A context-specific experience sampling device in accordance with another illustrative embodiment of the present disclosure may include an experience sampling unit 240 and an experience and context data analysis unit 250.

The experience sampling unit 240 may provide a user with a questionnaire associated with user's experience and receive user's response data to the questionnaire in connection with a video or audio record device.

The experience and context data analysis unit 250 may compare and analyze the response data for user's experienced context and environment and video or audio data, which are generated by the above-described video or audio record device and record a context and an environment at the time of the experience. Based on the comparison and analysis results and the response data by each activity for the context and environment, the experience and context data analysis unit 250 may analyze a relationship between user's context and environment and user's experience by each activity.

Here, the questionnaire may be generated based on user's context and environmental factors obtained by collecting and classifying user's experience information.

A context-specific experience sampling device in accordance with another illustrative embodiment of the present disclosure may receive user's response data by using a tablet terminal. The tablet terminal may be positioned adjacent to a product or a service requiring experience sampling. Accordingly, it is possible to collect and analyze user's experience in his/her daily lives in real time. This enables effective experience information sampling, compared to a conventional sampling technique, which depends on user's memory.

Figure 4:
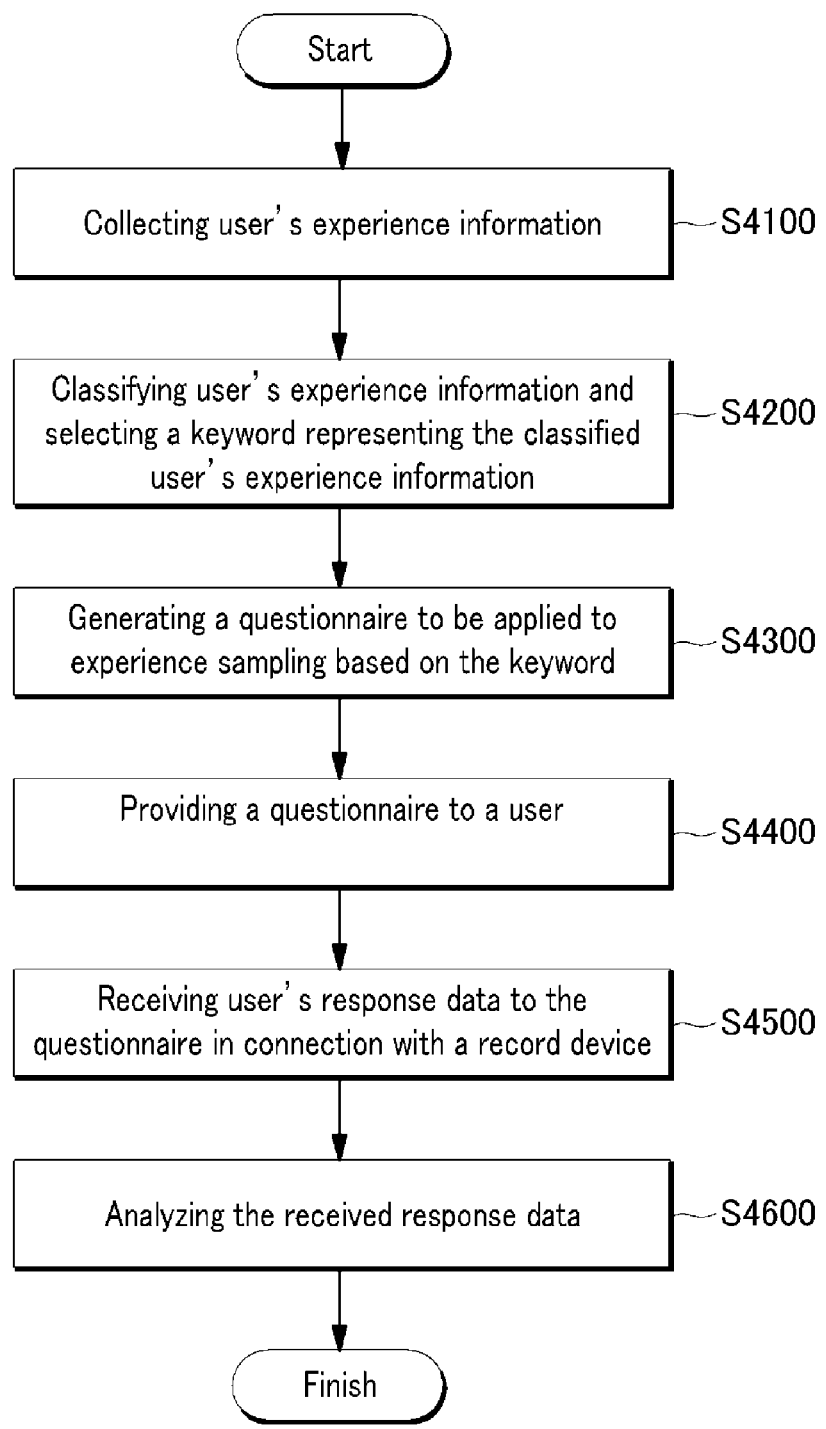
FIG. 4 is a flowchart for explanation of a context-specific experience sampling method in accordance with an illustrative embodiment of the present disclosure.

FIG. 4 is a flowchart for explanation of a context-specific experience sampling method in accordance with an illustrative embodiment of the present disclosure.

The context-specific experience sampling method in accordance with an illustrative embodiment of the present disclosure may be realized in the manner that the experience sampling server 200 and the user terminal 100 are connected to each other through the network 10. In addition, the experience sampling method may be realized on an independent terminal.

First, the experience sampling server 200 collects and pre-researches user's experience information (S4100).

For example, in case of collecting user's activity pattern with respect to a "refrigerator," a camera capable of recording video and audio data may be provided near the location where the refrigerator is provided, and user's activities to use the refrigerator may be collected in a day cycle. In case of collecting user's experience information for user's driving activities using an automobile, user's experience information may be collected by providing a camera in the inside of the automobile to record user's significant experience data such as user's activities to operate a handle, operate a radio device and use incidental equipment.

Next, the experience sampling server 200 classifies the collected user's experience information and selects keywords (experience words) representing the classified user's experience information (S4200).

Next, the experience sampling server 200 generates a questionnaire to be applied to experience sampling based on the keywords (experience words) (S4300).

Next, the experience sampling server 200 provides the generated questionnaire to the user terminal 100 (S4400), and receives response data by each activity for user's experienced context and environment in response to the questionnaire (S4500).

In S4500, according to circumstances, the experience sampling server 200 may receive input of the response data by each activity in connection with a video or audio record device.

For example, in case of conducting consumer analysis with regard to brightness of lamps in work offices, the experience sampling server 200 may provide question data by time zones to a user. More specifically, the experience sampling server 200 may collect user's experience information by providing questions together with a sound of "ding-dong" every business hour of from 9:00 am to 10:00 pm and receiving response data from the user.

Figure 5:
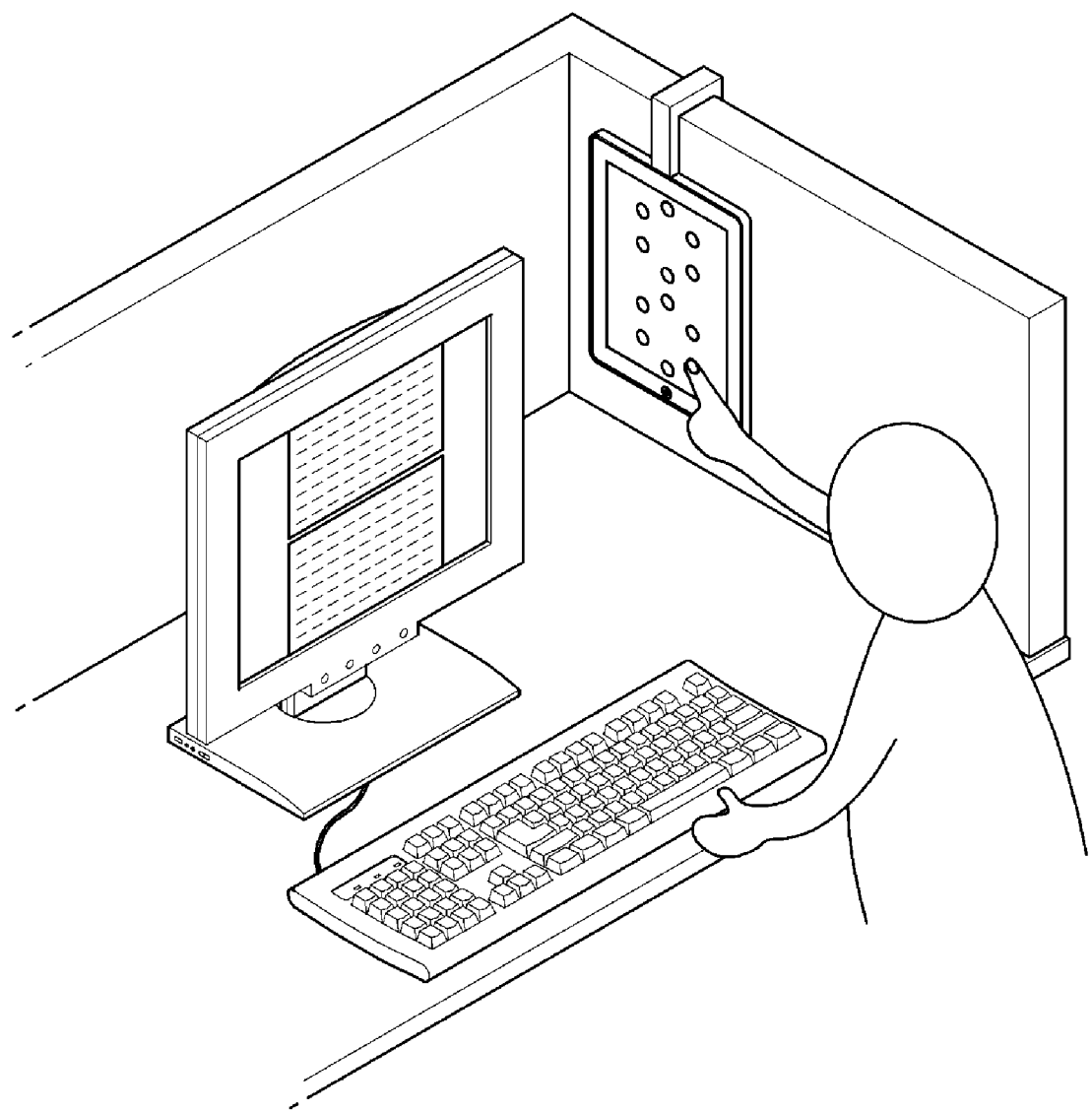
FIG. 5 shows one example for a process for receiving user's response data, in the context-specific experience sampling method in accordance with an illustrative embodiment of the present disclosure.

With reference to FIG. 5, the experience sampling system receives user's response data by providing a tablet terminal in user's work space for user's experience sampling.

Figure 6:
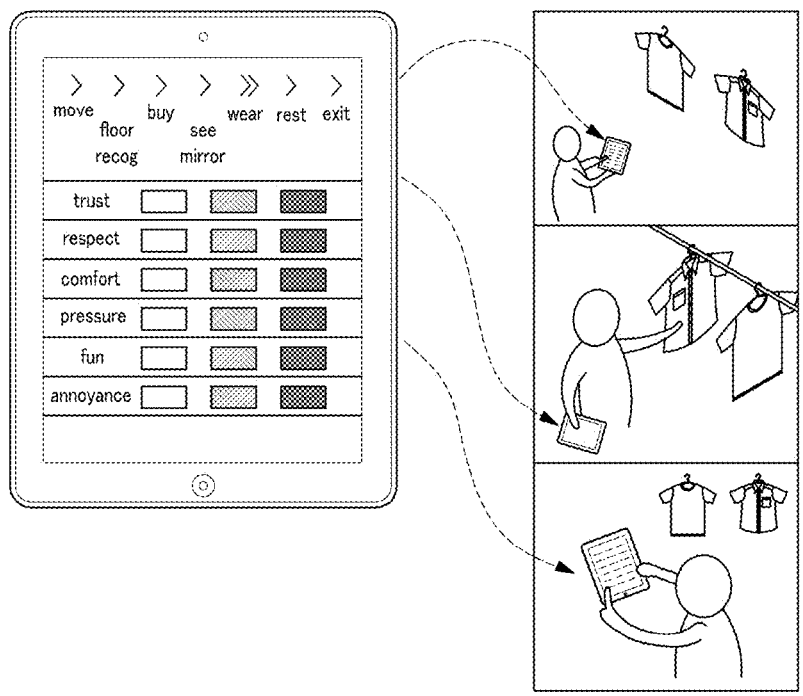
FIG. 6 shows another example for a process for receiving user's response data, in the context-specific experience sampling method in accordance with an illustrative embodiment of the present disclosure.

With reference to FIG. 6, the experience sampling system provides a smart phone (user terminal) with the experience estimating question based on user's activity pattern and context for user's experience sampling, and receives user's response data.

Next, the experience sampling server 200 analyzes a relationship between user's experience and user's context and environment by using the response data received from the user (S4600).

In S4600, the experience sampling server 200 may analyze a relationship between user's context and environment and user's experience, based on results obtained from comparing and analyzing the input response data and video or audio data generated by a video or audio record device, and the input response data.

The experience sampling server 200 basically executes qualitative analysis for the response data input from the user, and may provide the measured user's experience information in a form of a visualized graph or diagram, or others to the user. Each of the response data may be analyzed together with video and/or audio data, or in connection with individual context factors, e.g., time, user's activity type, user's work conditions and others.

The above description of the illustrative embodiments of the present disclosure is provided for the purpose of illustration, and it would be understood by those skilled in the art that various changes and modifications may be made without changing technical conception and essential features of the illustrative embodiments. Thus, it is clear that the above-described illustrative embodiments are illustrative in all aspects and do not limit the present disclosure. For example, each component described to be of a single type can be implemented in a distributed manner. Likewise, components described to be distributed can be implemented in a combined manner.

The scope of the inventive concept of the present disclosure is defined by the following claims and their equivalents rather than by the detailed description of the illustrative embodiments. It shall be understood that all modifications and embodiments conceived from the meaning and scope of the claims and their equivalents are included in the scope of the inventive concept.

What is claimed is:

1. A processor-implemented context-specific experience sampling method, the method comprising:
    classifying user experience information about an activity pattern comprising sequentially occurring physical activities of a user;
    selecting one or more keywords which are experience words representing the classified user experience information corresponding to the activity pattern comprising the sequentially occurring physical activities of the user, wherein each of the one or more keywords represents a user experience corresponding to one or more of the physical activities;
    generating an interface configured to receive experience evaluation from the user for experience sampling based on the selected keywords and the activity pattern comprising the sequentially occurring physical activities of the user to provide the generated interface to a user terminal through a network;
    displaying, via the interface, the one or more keywords along with degrees to which each of the one or more keywords describes the user experience and the sequentially occurring physical activities based on the activity pattern and context;
    receiving, for each physical activity, user response data generated based on a selection by the user among the displayed degrees for the one or more keywords and context data in connection with a record device;
    evaluating the user experience based on the received user response data; and
    analyzing, for each physical activity, a relationship between the evaluated user experience and a context experienced by the user while performing the activity pattern,
    wherein the receiving of the user response data comprises receiving the user response data through the interface, and receiving the context data through the record device, and wherein the context includes any one or any combination of two or more of:
    a goal context indicating an intention of the user in conducting each physical activity of the activity pattern,
    a relevant structure context indicating a structural object involved in each physical activity of the activity pattern,
    a physical context indicating a physical condition of an environment where each physical activity of the activity pattern takes place, and
    a psychological context indicating either one or both of a social situation of each physical activity of the activity pattern and an emotional state of the user during each physical activity of the activity pattern, and
    wherein the analyzing of the relationship comprises analyzing the relationship based on results obtained from comparing and analyzing the user response data and the context data received through the record device.

2. The context-specific experience sampling method of claim 1, wherein the user experience information is collected by recording the activity pattern of the user; and the activity pattern includes a response of the user to a product or a service.

3. The context-specific experience sampling method of claim 1, wherein:
    the interface is included in the user terminal;
    the user terminal is positioned adjacent to a location in which sampling will be executed; and
    the user terminal is a tablet terminal or a smartphone.

4. The context-specific experience sampling method of claim 1,
wherein the record device comprises a video recording device, an audio record device, a tablet terminal, or a smartphone.

5. The context-specific experience sampling method of claim 1, wherein the receiving of the user response data comprises receiving the user response data via the interface and the user terminal.

6. A context-specific experience sampling system, comprising:
a server having one or more processors configured to:
collect user experience information corresponding to an activity pattern comprising sequentially occurring physical activities of a user via a user terminal through a network;
classify the collected user experience information;
select keywords which are experience words representing the classified user experience information about the activity pattern comprising the sequentially occurring physical activities of the user, each of the keywords representing a user experience corresponding to one or more of the physical activities;
generate an interface configured to receive experience evaluation from the user for experience sampling based on the selected keywords and the activity pattern comprising the sequentially occurring physical activities of the user to provide the generated interface to a user terminal through the network;
display, via the interface, one or more of the keywords along with degrees to which each of the one or more keywords describes the user experience and the sequentially occurring physical activities based on the activity pattern and context;
receive, for each physical activity, user response data generated based on a selection by the user among the displayed degrees for the one or more keywords and context data in connection with a record device;
evaluate the user experience based on the received user response data; and
analyze, for each physical activity, a relationship between the evaluated user experience and a context experienced by the user while performing the activity pattern,
wherein the receiving of the user response data comprises receiving the user response data through the interface, and receiving the context data through the record device, and wherein the context includes any one or any combination of two or more of:
a goal context indicating an intention of the user in conducting each physical activity of the activity pattern,
a relevant structure context indicating a structural object involved in each physical activity of the activity pattern,
a physical context indicating a physical condition of an environment where each physical activity of the activity pattern takes place, and
a psychological context indicating either one or both of a social situation of each physical activity of the activity pattern and an emotional state of the user during each physical activity of the activity pattern, and
wherein the analyzing of the relationship comprises analyzing the relationship based on results obtained from comparing and analyzing the user response data and the context data received through the record device.

7. The context-specific experience sampling system of claim 6, wherein the user response data is received through the user terminal.

8. A context-specific experience sampling device, comprising: a server having one or more processors configured to:
classify user experience information about an activity pattern comprising sequentially occurring physical activities of a user via a user terminal through a network;
select one or more keywords which are experience words representing the classified user experience information about the activity pattern comprising the sequentially occurring physical activities of the user;
generate an interface configured to receive experience evaluation from the user for experience sampling based on the selected keywords and the activity pattern comprising the sequentially occurring physical activities of the user to provide the generated interface to the user terminal through the network;
display, via the interface, the one or more keywords along with degrees to which each of the one or more keywords describes the user experience and the sequentially occurring physical activities based on the activity pattern and context;
receive, for each physical activity, user response data generated based on a selection by the user among the displayed degrees for the one or more keywords and context data in connection with a record device;
evaluate the user experience based on the received user response data; and
analyze, for each physical activity, a relationship between the evaluated user experience and a context experienced by the user while performing the activity pattern,
wherein the receiving of the user response data comprises receiving the user response data through the interface, and receiving the context data through the record device, and wherein the context includes any one or any combination of two or more of:
a goal context indicating an intention of the user in conducting each physical activity of the activity pattern,
a relevant structure context indicating a structural object involved in each physical activity of the activity pattern,
a physical context indicating a physical condition of an environment where each physical activity of the activity pattern takes place, and
a psychological context indicating either one or both of a social situation of each physical activity of the activity pattern and an emotional state of the user during each physical activity of the activity pattern, and
wherein the analyzing of the relationship comprises analyzing the relationship based on results obtained from comparing and analyzing the user response data and the context data received through the record device.

9. The context-specific experience sampling system of claim 6, wherein:
an experience information collector is configured to collect the user experience information;
an experience information classifier is configured to classify the collected user experience information and select the keywords;
an experience evaluating question interface generator is configured to generate the interface;
an experience sampler is configured to provide the interface to the user and receive the user response data; and an experience and context data analyzer is configured to analyze the relationship between the context and the evaluated user experience based on the received user response data.

10. The context-specific experience sampling device of claim 8, wherein:
an experience sampler is configured to provide the interface to the user, and receive the user response data by each physical activity for the context and the environment; and
an experience and context data analyzer is configured to analyze the relationship between the context of the physical activities and the evaluated user experience based on the received user response data.

11. The context-specific experience sampling system of claim 9, wherein the experience information collector is configured to collect the user experience information by recording a response of the user to a product or a service.

12. The context-specific experience sampling system of claim 9, wherein:
the experience sampler is configured to receive the user response data by each physical activity through the interface and the context data through the record device, and
the experience and context data analyzer is configured to analyze the relationship based on results obtained from comparing and analyzing the user response data and the context data generated by the record device,
wherein the record device comprises a video recording device, an audio record device, a tablet, or a smartphone.

13. The context-specific experience sampling device of claim 10, wherein:
the experience sampler is configured to receive the user response data through the user terminal;
the user terminal is positioned adjacent to a product or a service; and
the user terminal is a tablet terminal or a smartphone.

14. The method of claim 1, wherein the analyzing of the relationship comprises comparing the user response data and either one or both of video data and audio data generated by the record device taken in connection with the user experience.

15. The method of claim 14, wherein the analyzing of the relationship further comprises checking for inconsistencies between the user response data and either one or both of the video data and the audio data.

16. The method of claim 14, wherein either one or both of the video data and the audio data are in connection with the receiving of the user response data.

\* \* \* \* \*